Jan. 13, 1925. 1,522,834
C. B. PERKINS
AUTOMATIC GEAR SHIFT
Filed Dec. 4, 1918 4 Sheets-Sheet 1
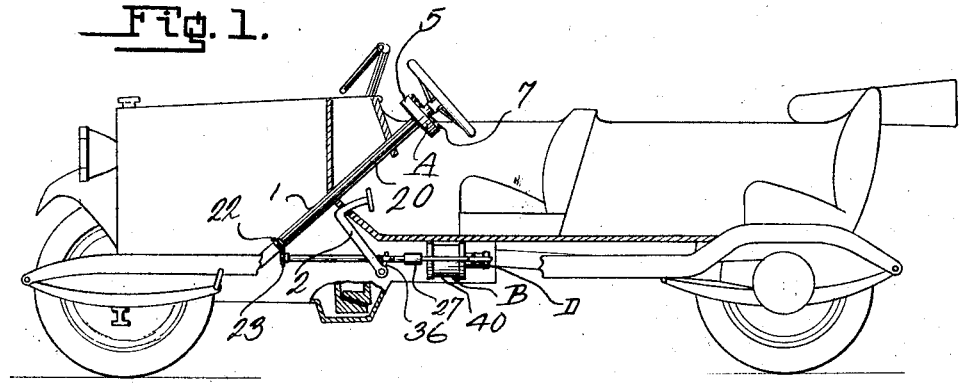
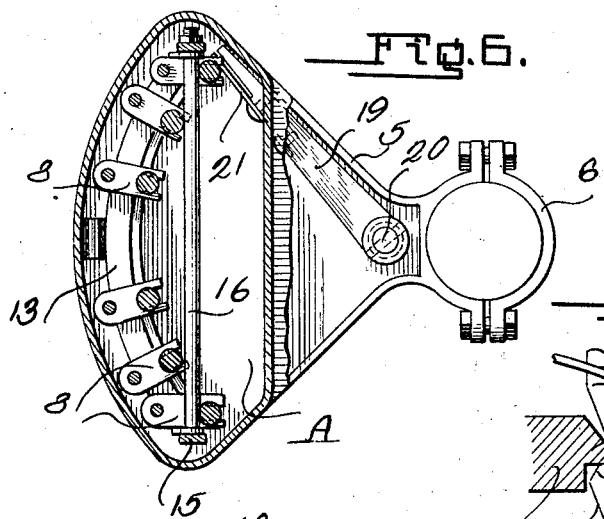
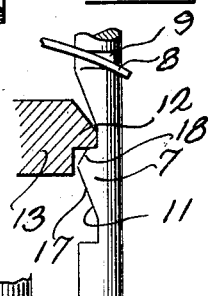
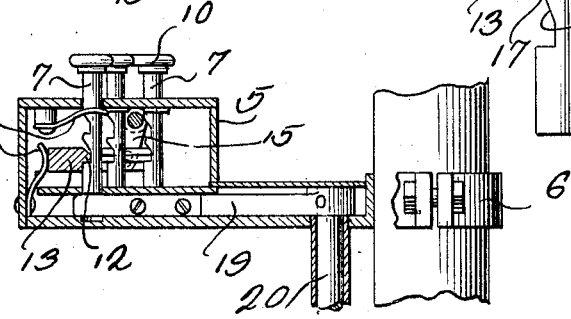
Inventor
Clarence B. Perkins
Attorneys Jan. 13, 1925.  1,522,834
C. B. PERKINS
AUTOMATIC GEAR SHIFT
Filed Dec. 4, 1918   4 Sheets-Sheet 2
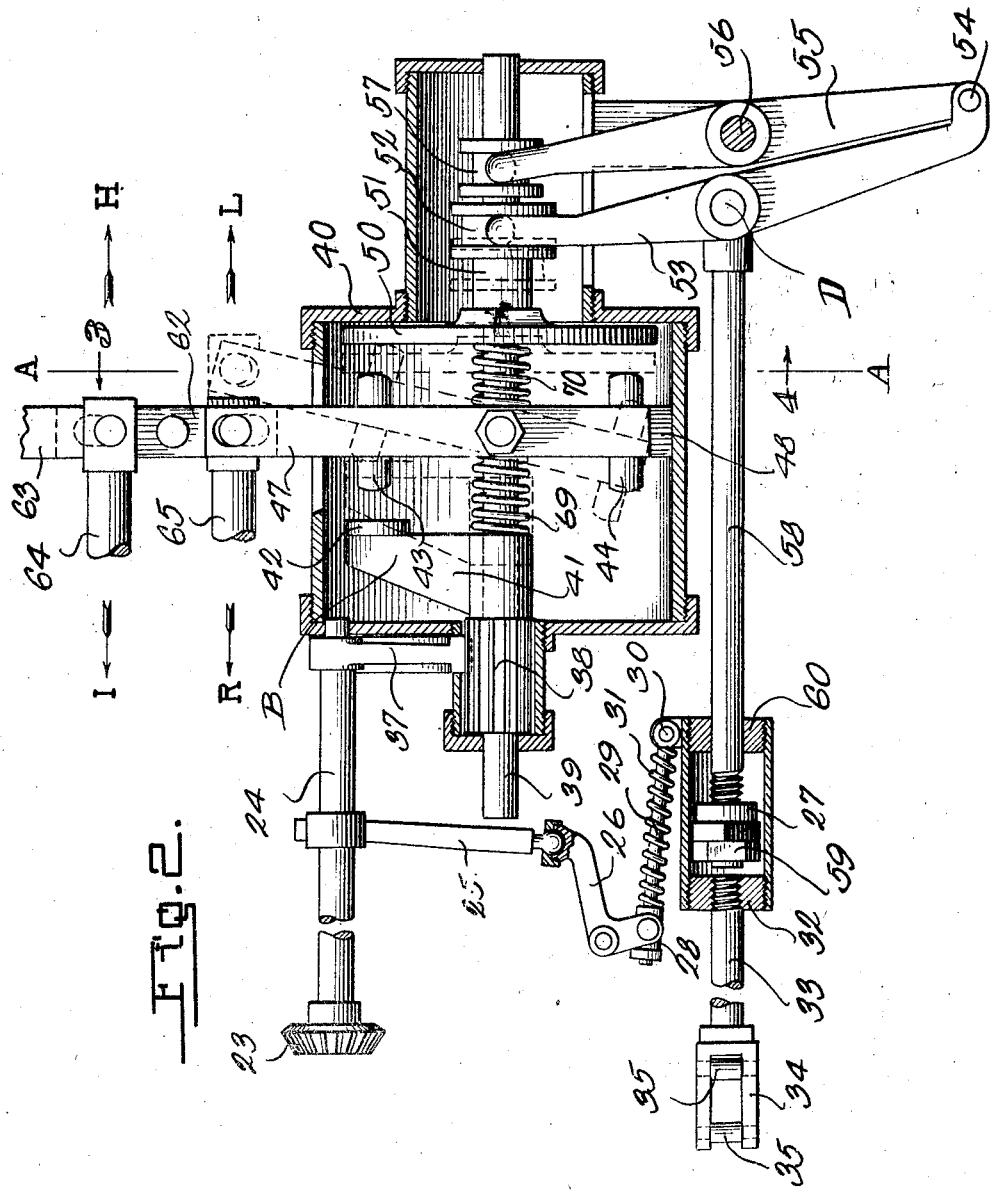
Clarence B. Perkins
Inventor Jan. 13, 1925.　　　　　　　　　　　　　　　1,522,834
C. B. PERKINS
AUTOMATIC GEAR SHIFT
Filed Dec. 4, 1918　　　　　　　　4 Sheets-Sheet 3
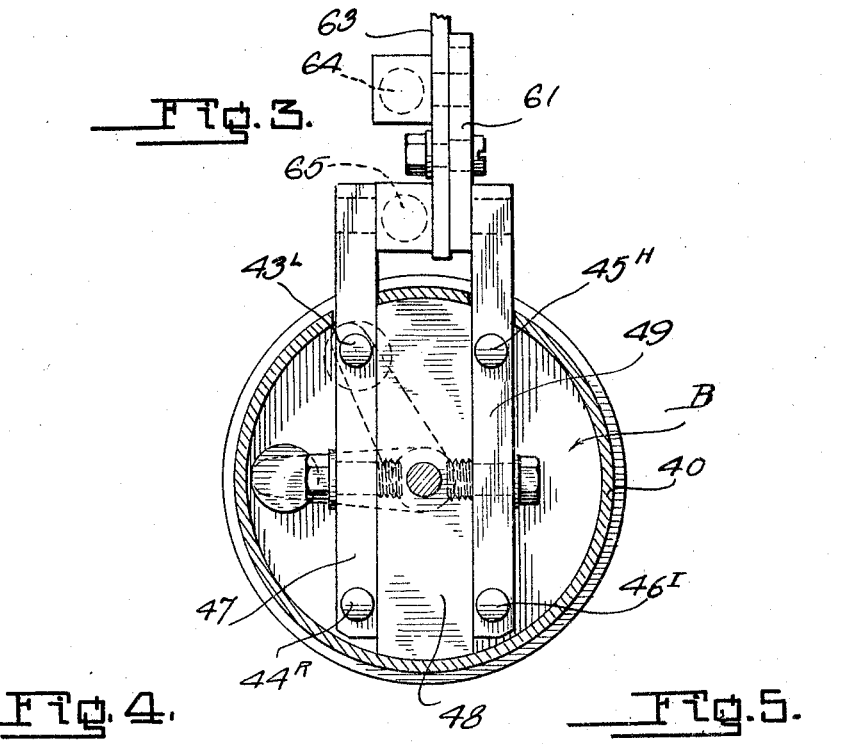
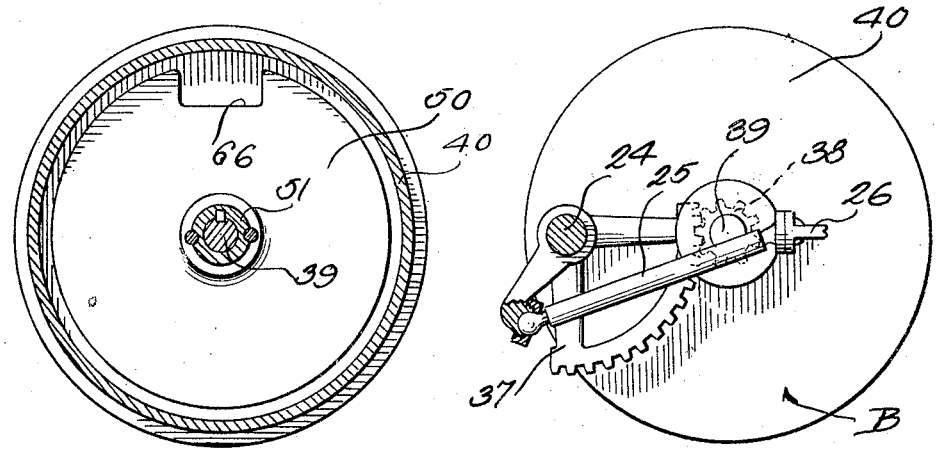
Clarence B. Perkins
Inventor
By Lancaster & Allwine
Attorneys Jan. 13, 1925.
C. B. PERKINS
1,522,834
AUTOMATIC GEAR SHIFT
Filed Dec. 4, 1918
4 Sheets-Sheet 4
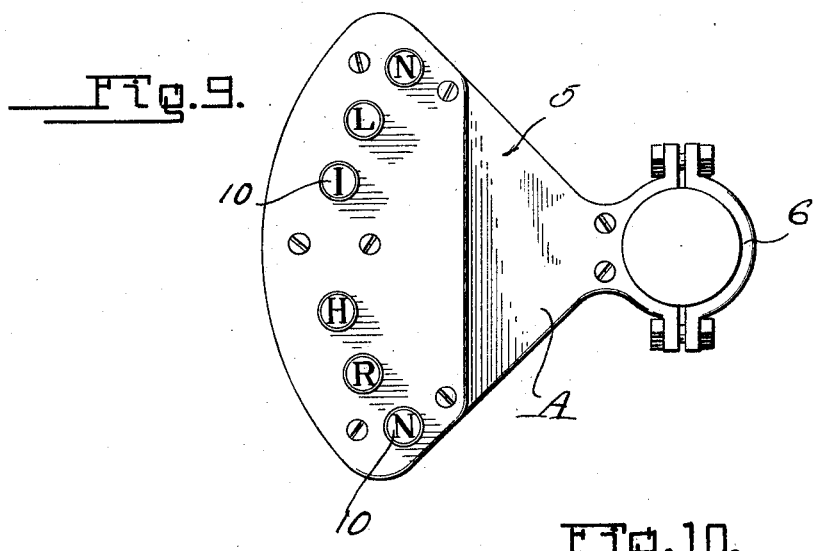
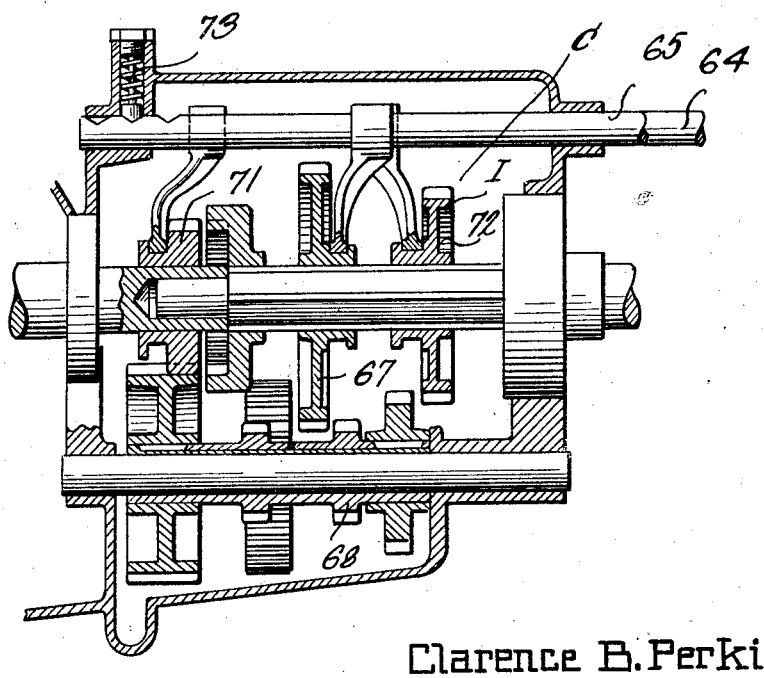
Clarence B. Perkins
Inventor Patented Jan. 13, 1925.

1,522,834

UNITED STATES PATENT OFFICE.

CLARENCE B. PERKINS, OF ILION, NEW YORK.

AUTOMATIC GEAR SHIFT.

Application filed December 4, 1918. Serial No. 265,232.

*To all whom it may concern:*

Be it known that I, CLARENCE B. PERKINS, a citizen of the United States, residing at Ilion, in the county of Herkimer and State of New York, have invented certain new and useful Improvements in an Automatic Gear Shift, of which the following is a specification.

This invention relates to improvements in the transmission gear structure of motor vehicles, and an object of the invention is to provide means for automatically shifting the speed-change gears.

The imperfection of the type of gear shifting mechanisms now in common use in connection with the popular makes of cars is evident particularly when a car is brought to a stop at a street or railroad crossing, especially at street crossings where traffic is controlled by a policeman. At such a point, when ready to start, the motorist should be on the alert and direct his attention to the steering and throttle control and not find it necessary to shift from neutral into low by reaching down and grasping a hand lever. In the large cities quick action in starting is essential. It is therefore the practice to bring the car to a stop at a street crossing, to press the pedal controlling the clutch and hold it in such position, at the same time operating the gear shifting lever to "low". Often it is necessary to hold the clutch out of engagement for several seconds which is great wear and tear on the clutch rollers and other mechanisms. The motorist does this so as to be able to start immediately when the signal is given to proceed. It is considered too dilatory to leave the gear shift lever in neutral and relieve the pressure on the clutch pedal while waiting for the signal, since under these conditions it is necessary to first depress the clutch mechanism and then move the gear shift lever to first or low; and it is an object of this invention to provide an automatic shifting mechanism which will avoid all of the above inconveniences and which leaves the operator free to direct his undivided attention toward steering and throttle control.

Another object of the invention is to provide a plurality of controlling pins to permit selective control of the shifting of the speed-change gears, and to provide a mechanism coacting with said pins and the ordinary clutch pedal, whereby the action resulting from the depression of one of the pins and the subsequent shifting of the clutch pedal will first disconnect the clutch and then automatically shift the gears into the desired speed as indicated by the pin depressed; and further to provide means operated during the connection of the clutch to return the gear shifting mechanism to its normal position.

A further object of the invention is to provide means for locking the pins when depressed and also to provide a construction whereby when one of the controlling pins is depressed it will release any controlling pin which has been previously depressed.

Further objects of the invention will appear hereafter and will be in part understood and in part disclosed in the following detailed description of preferred embodiment of the invention and from the drawings wherein:

Figure 1 is a fragmentary section through an ordinary motor vehicle showing the improved automatic gear shift applied thereto.

Figure 2 is a horizontal section through the shifting mechanism and the operating mechanism which is operated by the clutch pedal for in turn operating said shifting mechanism.

Figure 3 is a section taken on the line A—A of Figure 2 looking in the direction indicated by the arrow 3.

Figure 4 is a section taken on the line A—A of Figure 2 looking in the direction indicated by the arrow 4.

Figure 5 is an end view of the shifting mechanism.

Figure 6 is a horizontal section through the selective controlling means.

Figure 7 is a vertical section through the selective controlling means.

Figure 8 is an enlarged detail of one of the depressible pins of the selective controlling mechanism.

Figure 9 is a top plan of the selective controlling mechanism, and

Figure 10 is a vertical section through the speed-change gears.

Referring more particularly to the drawings, wherein like characters indicate like and corresponding parts throughout the several views, the selective control means A is preferably carried by the steering post 1 of an ordinary motor vehicle in such position that it may be conveniently reached and operated by the driver of the vehicle. This selective controlling means A, is connected, by suitable connecting mechanism to the shifting mechanism B for shifting the speed-change gears C of the motor vehicle. The shifting mechanism B is operated by the operation of the selective controlling means A to permit the adjustment thereof to properly move the gears C to place the gear selected into operative connection with the prime mover or driving power of the motor vehicle and this shifting mechanism, is operated by the depression of the clutch pedal 2 of the motor vehicle through the medium of the operating mechanism D.

The selective controlling mechanism A comprises a suitable casing 5 which is attached by means of a clamp structure 6 to the steering post 1 of the motor vehicle. A plurality of pins 7 are slidably carried by the casing 5, being held in extended or upper position by flat springs 8 which engage in notches 9 formed in the pins 7. These pins 7 have caps or heads 10 upon their outer ends bearing letters or suitable indicia to indicate the respective gears of the speed-change gears C, the operative shifting of which they control. For instance, the two end or outermost pins 7 which control the shifting of the gears C into neutral position carry the letter N or other suitable indicia upon the heads 10 thereof, while the other pins carry suitable indicia upon their heads to indicate low speed, intermediate, high and reverse as clearly shown in Figure 9 of the drawings. Each of the pins 7 is provided with superposed notches 11 which terminate in square shoulders at their lower end and are adapted to receive therein the rib 12 formed upon a locking bar 13. The locking bar 13 is held in a locking position by a flat spring 14, the rib 12 thereof resting in the lowermost recesses of the pins when the latter are in their extended position. When one of the pins 7 is depressed, the locking bar 13, is moved away from the pin, it riding over the upper inclined side of the notch 11 and moving into the uppermost notch of the depressed pin at which time the spring 14 again moves it inwardly to lock the pin in its depressed position. The locking bar 13 is supported by or suspended within the casing 5 by a pair of pivotally mounted links 15 which are connected to the ends of a rod 16. The rod 16 is supported by suitable means within the casing and extends across the same to connect the ends of the locking bar 13. The upper inclined sides 17 of the lowermost notches 11 are provided with oppositely inclined portions 18 which permit the release of any depressed pin, upon the depression of a second pin, prior to the movement of the locking bar 13 into a locking position, thereby allowing the said released pin to be moved upwardly or into its extended position by means of the spring 8 connected thereto, resulting in the elimination of the improper operation of the gears C owing to the fact that only one pin may remain depressed at a time.

The depressed pin will limit the swinging movement of the arm 19, which is mounted within the casing and has one end keyed to the upper end of a rod 20. A suitable cushioning structure 21 is carried by the free end of the arm 19 to cushion its striking action against the pin. The rod 20 extends downwardly along the steering post 1 and has a bevelled pinion 22 mounted upon its lower end which meshes with a bevelled pinion 23. The bevelled pinion 23 is mounted upon the shaft 24 which has direct communication with the shifting mechanism B for properly setting this mechanism. The shaft 24 is connected, by means of an arm 25, which is connected by means of a universal joint to a bell crank 26, which bell crank is in turn connected to a sleeve or cylinder 27. The bell crank 26 is pivotally connected to a collar 28 which is slidably mounted upon a rod 29, the said sleeve 27 being held at a remote or extended position from the pivot 30 of the rod by a spiral spring 31.

The sleeve or cylinder 27 has a removable head 32 in one end thereof to which a rod 33 is connected. The rod 33 has a forked head 34 which carries a pair of rollers 35. The rollers 35 are engaged by an arm 36 which is in turn directly connected to the clutch pedal 2 so that when the clutch pedal 2 is depressed, it will rotate the shaft 24, rotating the segmental rack 37 which meshes with a disc 38 mounted upon the main shaft 39 of the shifting mechanism B.

The shaft 39 extends axially through the casing 40 of the shifting mechanism B and it has an arm 41 keyed thereon. A disc 42 is carried by one side of the arm 41 near its outer end and this disc is adapted to be moved into alignment with any one of the pins 43, 44, 45 or 46 upon the rotation of the shaft 39, the position of the disc being regulated by the pins 7, the movement of the said arm 41 and the disc 42 being controlled by the pins 7 for permitting the selection of the positioning of the speed-change gears C. These pins 43 and 44 are carried by a bar 47 which is pivotally connected to a suitable block 48 within the housing 40 while the pins 45 and 46 are carried by an arm 49 which is pivotally connected to the block 48. The pins 43 and 45 are positioned upon opposite sides of the pivot of their respective carrying arm from the pins 44 and 46, and all of these project substantially the same distances upon each side of their carrying arms, so that they may be engaged by the disc 50, to move the arms 47 and 49 into straight position. The disc 50 is carried by a sleeve 51 which is slidably mounted upon the shaft 39.

A channeled collar 52 is keyed upon the sleeve 51 and it receives in the channel thereof the forked end of a lever 53. The lever 53 is pivotally connected, at 54 to the outer end of a lever 55. This lever 55 is pivotally mounted upon a suitable pin 56, and it has its end remote from the end which is pivoted to the lever 53 forked and connected to a channeled collar 57 which is keyed upon the shaft 39. A rod 58 is connected to the lever 53 intermediate its ends and it has a head 59 removably mounted thereon which is seated in the cylinder or sleeve 27. The head 59 is slidably mounted within the cylinder 27 and is adapted to engage against the removable head 60 of the cylinder for operating or moving the rod 58 by the movement of the rod 33.

The arm 49 extends outwardly through the upper portion of the housing 40 and is connected to an arm 61 which is pivotally connected intermediate its ends to a suitable supporting bracket 63. The arm 61 is connected to a rod 64 which is in turn connected to the high and intermediate gears of the speed-change gears C. The arm 47 is connected at its outer end to the rod 65 which is in turn connected to the low and reverse speed gears for shifting the same.

In Figure 10, an approved type of speed-change gearing is illustrated, but it is to be understood than any ordinary or approved type of speed-change gearing may be employed in lieu of that shown in this figure without departing from the spirit of the invention.

When it is desired to shift the gear into low, the pin 7 which carries the indicia relating to low is depressed, and when the clutch pedal 2 is depressed, the rod 33 will be moved longitudinally, towards the left in Figure 2 and this movement will disengage the clutch and rotate the shaft 24, which will rotate the shaft 39, through the medium of the rack 37 and gear 38, until the arm 19, engages the depressed pin 7 which will arrest further rotation of the shaft 24 owing to the fact that the shaft 24 is geared to the rod 20. When the movement of the shaft 24 is arrested by the striking of the arm 19 against the depressed pin 7, the disc 42 will be positioned in alignment with the pin 43. The further depressing movement of the pedal 2 will connect the rods 58 and 33 through the medium of the head 59 to first rock the lever 53 which will move the disc 50 inwardly, striking all of the pins 43, 44, 45 and 46 and moving them to move the gears of the mechanism B into a neutral position while further movement of the clutch pedal will rock the lever 55 upon its pivot and shift the shaft 39 in the opposite direction to which the sleeve 51 and the disk 50 were shifted, causing the disc 42 to strike the pin 43 with which it is in alignment and rock the arm 47 to shift the shaft or rod 65 as indicated in dotted lines in Figure 2 of the drawings, to move the gear 67 into mesh with the pinion 68 to operate the motor vehicle at low speed. The disc 50 is provided with a recess 66 extending inwardly from its periphery, which recess is positioned, during the rotation of the shaft 39 and the movement of the arm 41 into alignment with the pin with which the disc 42 aligns so as to allow the portion of this pin which projects upon the side of the lever from the disc 42 to pass through the opening to allow the proper operation of the rod to which the lever is connected.

Springs 69 and 70 are coiled about the shaft 39 engaging the block 48 and the arm 41 and disc 50 respectively for returning these members to their normal positions after operation or movement by the pivotal movement of the levers 53 and 55.

When it is desired to shift the gears into high the pin 7 carrying the indicia relating to high is depressed, and the disc 42 carried by the arm 41 will be moved in the manner heretofore described, into alignment with the pin 45 which will shift the gear 71 into operative position. The pin 46 controls the shifting of the gear 72, to provide for the intermediate speed while the pin 44 controls the shifting of the gear 67 for reversing the direction of travel of the motor vehicle.

The mechanism indicated at 73 in Figure 10 is merely provided for preventing accidental shifting movement of the rod and is commonly employed in the speed-change gears of motor vehicles, it forming no part of this invention.

From the foregoing description, taken in connection with the drawings, it will be seen that upon the depression or movement of the clutch pedal 2, the clutch will first be disconnected, during which movement the shifting mechanism B will be properly set, in accordance with the operation of the selective controlling mechanism A after which the levers 53 and 55 will be operated, the further shifting or continuous movement of the clutch pedal 2 will shift the sleeve 51 and shaft 39 for operating the shifting mechanism B to shift the gears of the speed-change gear mechanism C. The levers 53 and 55 remaining inoperative during the movement of the rod 33 and the sleeve 27, or until the head 59 of the rod 58 engages the head 60, thus permitting of the proper positioning of the lever 41 prior to the shifting of the sleeve 51 and shaft 39.

Changes in details may be made without departing from the spirit of this invention, but;

I claim:

1. In gear shifting mechanism for motor vehicles, the combination with the speed-change gears, clutch and clutch operating pedal of a motor vehicle, of a shifting mechanism comprising a pair of pivotally supported arms, adapted to have connection with said speed-change gears, pins carried by said arms, a disc adapted to engage said pins to move said arms into a neutral position, and means connecting said disc and said clutch pedal for operating the disc upon depression of the clutch pedal.

2. In gear shifting mechanism for motor vehicles, the combination with the speed-change gears, clutch and clutch operating pedal of a motor vehicle, of a shifting mechanism comprising a pair of pivoted arms, pins carried by said arms, adjustable means adapted for engagement with any one of said pins to rock the arm carrying the pin engaged, means operatively connecting said clutch pedal and said adjustable means for first adjusting the position of the adjustable means and then operating the said means to rock one of said arms, and selective means independently of said clutch pedal for regulating the adjusted movement of said adjustable means, and means operated by depression of said clutch pedal for moving said arms into a neutral position prior to the rocking of the arms by said adjustable means.

3. In gear shifting mechanism for motor vehicles, a shifting mechanism comprising a pair of pivotally supported arms, pins carried by said arms, a shaft, a pin-engaging member carried by said shaft, means for rotating said shaft to position said pin-engaging member in alignment with one pin carried by one of said arms, means for moving said shaft longitudinally to rock the arm by engagement of said pin-engaging means with one of said pins, and selective means for controlling the rotation of said shaft, a disc slidably mounted upon said shaft, and means for operating said disc prior to longitudinal movement of the shaft for moving said arms into a neutral position.

4. In gear shifting mechanism for motor vehicles, the combination with the speed-change gears, clutch and clutch operating pedal of a motor vehicle, of a shifting mechanism adapted to have connection with said speed-change gears, means for operating said shifting mechanism by the operation of said clutch operating pedal comprising a rod, a cylinder mounted upon one end of said rod, a second rod, a head upon said second rod and slidably mounted in said cylinder, operating means for said shifting mechanism connected to said second rod, said first rod adapted to move a limited distance prior to the transmission of movement to said second rod, adjustable means for regulating the operation of said shifting mechanism, and means connected to said cylinder and said adjustable means for operating the adjustable means prior to the transmission of movement to said second rod.

5. In gear shifting mechanism for motor vehicles, the combination with the speed-change gears and clutch operating pedal of a motor vehicle, of a shifting mechanism adapted to have connection with said speed-change gears, a rod connected to said clutch pedal, a cylinder connected to said rod, adjustable means for operating said shifting mechanism, means connecting said cylinder and said adjustable means for adjusting the position of the adjustable means upon movement of the cylinder.

6. In gear shifting mechanism for motor vehicles, the combination with the speed-change gears and clutch operating pedal of a motor vehicle, of a shifting mechanism adapted to have connection with said speed-change gears, a rod connected to said clutch pedal, a cylinder connected to said rod, adjustable means for operating said shifting mechanism, means connecting said cylinder and said adjustable means for adjusting the position of the adjustable means upon movement of the cylinder, a second rod, a head upon said second rod slidably seated in said cylinder, means connected to said second rod for moving said shifting mechanism into a neutral position upon movement of the second rod, said cylinder and head arranged to permit limited movement of the cylinder prior to the transmission of movement to the second rod, whereby said adjusting means may be adjusted prior to movement of the shifting means into a neutral position.

7. In gear shifting mechanism for motor vehicles, the combination with the speed-change gears and clutch operating pedal of a motor vehicle, of a shifting mechanism adapted to have connection with said speed-change gears, a rod connected to said clutch pedal, a cylinder connected to said rod, adjustable means for operating said shifting mechanism, means connecting said cylinder and said adjustable means for adjusting the position of the adjustable means upon movement of the cylinder, a second rod, a head upon said second rod slidably seated in said cylinder, means connected to said second rod for moving said shifting mechanism into a neutral position upon movement of the second rod, said cylinder and head arranged to permit limited movement of the cylinder prior to the transmission of movement to the second rod, whereby said adjusting means may be adjusted prior to movement of the shifting means into a neutral position, and means connected to said second rod for operating said adjustable means subsequent to the operation of said means which move said shifting mechanism into a neutral position.

CLARENCE B. PERKINS.